Patented July 22, 1947

2,424,262

UNITED STATES PATENT OFFICE 2,424,262

COORDINATED ZIRCONYL AND HAFNYL COMPOUNDS AND THEIR PRODUCTION

Eugene Wainer, Niagara Falls, N. Y., assignor to The Titanium Alloy Manufacturing Company, New York, N. Y., a corporation of Maine No Drawing. Application June 23, 1943, Serial No. 491,941

7 Claims. (Cl. 260—429)

The present invention relates to water soluble salts of zirconium and more particularly to coordination compounds of zirconyl salts of organic acids combined with alkali metal salts including ammonium and alkaline earth metal salts of mineral acids, and to methods of manufacturing such coordination compounds.

Water soluble salts of zirconium have utility in the textile treatment field for such applications as waterproofing, fireproofing, weighting, etc. Development of the desired properties require immersion of the textile in a bath in which at least one of the major constituents is a water soluble zirconium salt. The strong acid salts, such as the chloride, nitrate, and sulphate cannot be used directly for this purpose because these salts always develop sufficient free acid in water solution to rot and disintegrate the cloth. Zirconium acetate is entirely suitable for the purpose since any free acetic acid the salt may contain does not have a deleterious effect on the fabric. However, the manufacture of zirconium acetate on a commercial scale is rather difficult since the salt must be obtained by evaporation of a solution. The salt tends to decompose rather readily so that heating in evaporation processes cannot normally exceed 60 to 70° C. Further, the evaporated residue tends to be a gummy mass from which elimination of water is tediously slow even in a vacuum system. If the salt is overheated, the major portion of the residue is insoluble in water due to loss of acetic acid, even though extra acid be subsequently added.

It is an object of the present invention to prepare water soluble salts of zirconium and acids, the degree of ionization of which in water solution is greater than that of carbonic acid. It is also an object of the invention to provide water soluble zirconium salts that may be used in textile treatment but which do not suffer the disadvantages of zirconium acetate. It is also an object of the invention to provide new and novel zirconium compounds possessing all the beneficial properties of zirconium acetate but possessing none of the defects thereof. The compounds of the present invention are pulverulent powders permitting ready escape of the water in the drying step and compounds which may be evaporated at temperatures on the order of 100 to 125° C.

The novel results of the present invention are accomplished by adding a water solution of a strong acid salt of zirconium, such as the chloride, sulphate, or nitrate, to a water solution or suspension of a carbonate. Usually, though not necessarily, the carbonate will be in stoichiometrical excess, and it is not necessary that the carbonate be soluble in water. This system, containing a heavy amount of precipitate is then added to an excess of an acid whose degree of ionization is greater than that of carbonic acid. A substantially clear solution is obtained. This solution is then evaporated to dryness at 100 to 125° C. The resultant product is soluble in water. If any difficulty is experienced in obtaining solution, the addition of a few drops of acetic acid will hasten the process. It may be seen from the above that even though the strong acid ion is still present in the compound, it is now tied up in the form of a salt from which no free strong acid is available for disintegrating the cloth.

The weak acids suitable for reaction with the system containing the precipitated carbonate comprise in general organic acids such as acetic acid or other water soluble fatty acids, as well as poly-carboxylic acid such as citric acid, oxalic acid, tartaric acid, as well as many other acids. In fact, substantially any acid may be employed to this end which possesses a degree of ionization in water solution which is greater than that of carbonic acid.

The invention, therefore, comprises these two major steps, first, preparation of a carbonate of zirconium and secondly, the transformation of the system containing the carbonate to the coordination salt. In the first step a wide selection of carbonates is available. Eminently suitable for reaction with the zirconium salt of the strong acid are the carbonates of ammonium, the alkali metal carbonates and carbonates of the metals of group 2, such as magnesium, calcium, strontium and barium. The carbonates of beryllium, zinc and lead may also be employed in the reaction. The use of carbonates of the latter, however, present no particular advantage over the employment of carbonates of the alkali metals including ammonium and of alkaline earth metals.

In order to obtain complete reaction, the following precautions should be observed. In preparation of the intermediate, the acid zirconium salt solution should always be added to the carbonate, and not vice versa. After the addition is complete, stirring should be continued for at least 15 minutes. In finishing, the zirconium carbonate should be added to the acid solution and not vice versa. The solution is not evaporated until all frothing has been completed. Frothing can be eliminated by use of 2 to 3 drops of octyl alcohol per gallon of reacting solution.

In examining the general procedure outlined above, it might appear that the end product is a simple mixture of zirconium acetate and the strong acid salt of the starting carbonate. However, in view of the greater stability of the complex to heat, it is not plausible to assume that the complex is just a mixture of two or more compounds. Attempts to separate the ingredients by slow crystallization from solution failed and only a single crystalline form could be obtained. The crystalline growth even from dilute solutions tended to be dendritic. When growth was very slow, sheets with great length and breadth were obtained but were very thin. Their crystalline nature was established by appearance of polarization colors on thicker portions. Since no evidence could be obtained for the presence of the strong acid salt as an entity even in the case of the sodium chloride complex, it must be assumed that a new compound has been made comprising a coordination compound of the salt and a zirconyl salt of the weak acid.

Examples of my method of practicing the invention are as follows:

*Example 1*

To one liter of a solution containing 220 grams of $Na_2CO_3$ is added 1 liter of solution containing 512 grams of $ZrOCl_2.8H_2O$. The addition is made in a thin stream and requires 10 to 15 minutes for the complete addition. After the addition is complete, the batch is stirred for 15 minutes. The precipitated batch is then added slowly with stirring to 300 cc's. of glacial acetic acid, again killing the froth with octyl alcohol. After all bubbling ceases the liquor is evaporated to dryness at 100 to 120° C. a dry, white, pulverulent powder is obtained weighing 610 grams.

*Example 2*

Same as Example 1 except 335 grams of potassium carbonate is used (85% hydrate grade instead of $Na_2CO_3$). Yield is 638 grams.

*Example 3*

Same as Example 1 except 236 grams of $(NH_4)_2CO_3.H_2O$ is used instead of sodium carbonate. Yield is 604 grams.

*Example 4*

Same procedure as in Example 1 except 220 grams of $CaCO_3$, or 435 grams of $BaCO_3$, or 325 grams of $SrCO_3$, or 220 grams of hydrated magnesium carbonate is used in place of the $Na_2CO_3$. In each case the carbonate is used as a slurry in 1 liter of water.

The yields are as follows:

| | Grams |
|---|---|
| Calcium derivative | 719 |
| Barium derivative | 1077 |
| Strontium derivative | 793 |
| Magnesium derivative | 714 |

From these yield figures the approximate empirical formulae for Examples 1 through 4 are as follows:

$ZrOAC_2.2NaCl.2H_2O$
$ZrOAC_2.2KCl.2H_2O$
$ZrOAC_2.2NH_4Cl.2H_2O$
$ZrOAC_2.CaCl_2.6H_2O$
$ZrOAC_2.MgCl_2.7H_2O$
$ZrOAC_2.SrCl_2.6H_2O$
$ZrOAC_2.BaCl_2.12H_2O$

*Example 5*

Same as in Example 1 except 425 grams of $ZrO(NO_3)_2.2H_2O$ was used in place of the zirconium oxychloride. Yield is 692 grams. Empirical formula $ZrOAC_2.2NaNO_3.2H_2O$.

*Example 6*

Same as Example 1 except 356 grams of $Zr(SO_4)_2.4H_2O$ was used in place of the zirconium oxychloride. Yield is 678 grams.

Although the above specific examples all apply to the preparation of coordination compounds of zirconium, similar coordination compounds of hafnium can also be prepared by substituting hafnium salts for the zirconium salts listed above.

The examples given herein are purely for purpose of illustration rather than as limitative of the scope of the invention, as the invention is limited only by the appended claims.

As indicated above new and novel coordinated compounds of hafnyl and zirconyl may be prepared of the general composition

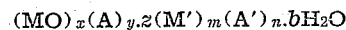

where MO is the hafnyl or zirconyl ion, A is a negative ion of an acid whose ionization is greater than carbonic acid, M' a metallic ion including ammonium, and A' is a negative ion of an acid. The symbols $b$, $m$, $n$, $x$, $y$ and $z$ are integers.

What is claimed is:

1. As a new composition coordinated compounds of the general formula

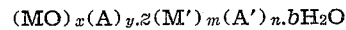

where MO represents a basic ion selected from the group consisting of zirconyl or hafnyl ions, A is an acid radical from an acid whose ionization is greater than that of carbonic acid, M' is an ion selected from the group consisting of the alkali metals, the alkaline earth metals, magnesium, zinc, beryllium and ammonium, and A' is a negative ion from a strong inorganic acid of the group consisting of sulfuric acid, hydrochloric acid and nitric acid, $b$, $x$, $y$, $z$, $m$, and $n$ are integers.

2. As a new composition the coordinated compound $ZrO(CH_3COO)_2.2NaCl.2H_2O$.

3. As a new composition the coordinated compound $ZrO(CH_3COO)_2.CaCl_2.6H_2O$.

4. As a new composition the coordinated compound $ZrO(CH_3COO)_2.MgCl_2.7H_2O$.

5. The method of making a coordination compound of a basic ion selected from the group consisting of zirconyl and hafnyl ions which comprises adding a water soluble salt of the basic ion with a strong inorganic acid of the group consisting of sulfuric acid, hydrochloric acid and nitric acid to a carbonate selected from the group consisting of the carbonates of the alkali metals, the alkaline earth metals, magnesium, zinc, beryllium and ammonium and thereafter adding the reaction mixture to sufficient of an organic acid having an ionization constant greater than that of carbonic acid completely to react therewith.

6. The method of making a coordination compound of a basic ion selected from the group consisting of zirconyl and hafnyl ions which comprises adding a water soluble salt of the basic ion with a strong inorganic acid of the group consisting of sulfuric acid, hydrochloric acid and nitric acid to a carbonate selected from the group consisting of the carbonates of the alkali metals, the alkaline earth metals, magnesium, zinc, beryllium and ammonium and thereafter adding the reaction mixture to sufficient of a water soluble fatty acid completely to react therewith.

7. The method of making a coordination compound of a basic ion selected from the group consisting of zirconyl and hafnyl ions which comprises adding a water soluble salt of the basic ion with a strong inorganic acid of the group consisting of sulfuric acid, hydrochloric acid and nitric acid to a carbonate selected from the group consisting of the carbonates of the alkali metals, the alkaline earth metals, magnesium, zinc, beryllium and ammonium and thereafter adding the reaction mixture to sufficient acetic acid completely to react therewith.

EUGENE WAINER.

REFERENCES CITED

The following references are of record in the file of this patent:

Mellor, "Comprehensive Treatise on Inorganic and Theoretical Chemistry," vol. VII (1927), pp. 102, 103, 104, 147, 155, 156, 157, 160, 161, 168 and 169.

Browning, "Introduction to the Rarer Elements," 4th ed., 1919, Wiley (copy in Div. 6), pp. 78 to 81.